(12) United States Patent
Dailey et al.

(10) Patent No.: US 6,917,952 B1
(45) Date of Patent: Jul. 12, 2005

(54) APPLICATION-SPECIFIC METHOD AND APPARATUS FOR ASSESSING SIMILARITY BETWEEN TWO DATA OBJECTS

(75) Inventors: Matthew N. Dailey, San Diego, CA (US); Anu K. Pathria, La Jolla, CA (US); Mark A. Laffoon, San Diego, CA (US); Theodore J. Crooks, La Mesa, CA (US)

(73) Assignee: Burning Glass Technologies, LLC, San Diego, CA (US)

( * ) Notice: Subject to any disclaimer, the term of this patent is extended or adjusted under 35 U.S.C. 154(b) by 535 days.

(21) Appl. No.: 09/988,620

(22) Filed: Nov. 20, 2001

Related U.S. Application Data

(63) Continuation-in-part of application No. 09/589,180, filed on May 26, 2000.

(51) Int. Cl.[7] .............................................. G06F 17/30
(52) U.S. Cl. ............................. 707/203; 707/5; 706/46
(58) Field of Search .................... 707/1–10, 100–104.1, 707/200–205; 709/224; 706/23

(56) References Cited

U.S. PATENT DOCUMENTS

| | | | |
|---|---|---|---|
| 6,266,668 B1 * | 7/2001 | Vanderveldt et al. .......... | 707/10 |
| 6,430,615 B1 * | 8/2002 | Hellerstein et al. .......... | 709/224 |
| 6,725,208 B1 * | 4/2004 | Hartman et al. .............. | 706/23 |
| 6,728,695 B1 * | 4/2004 | Pathria et al. ................. | 707/2 |

OTHER PUBLICATIONS

Hofmann, Thomas, "*Probabilistic Latent Semantic Indexing*", SIGIR, Aug. 1999 Berkeley, CA USA, Copyright 1999 ACM 1–58113–096–1/99/0007.

Hofmann, Thomas, "*Learning the Similarity of Documents: An Information–Geometric Approach to Document Retrieval and Categorization*", Advances in Neural Information Processing Systems 12, MIT Press (2000).

Todd, Peter M. and Rumelhart, David E., "*Feature Abstraction from Similarity Ratings: A Connectionist Approach*", unpublished manuscript.

Steyvers, Mark and Busey, Tom, "*Predicting Similarity Ratings to Faces Using Physical Descriptions*", Predicting Similarity Ratings, (2000).

\* cited by examiner

*Primary Examiner*—Mohammad Ali
(74) *Attorney, Agent, or Firm*—McDermott Will & Emery LLP

(57) ABSTRACT

The similarity between two data objects of the same type (e.g., two resumes, two job descriptions, etc.) is determined using predictive modeling. A basic assumption is that training datasets are available containing compatibility measures between objects of the first type and data objects of a second type, but that training datasets measuring similarity between objects of the first type are not. A first predictive model is trained to assess compatibility between data objects of a first type and data objects of a second type. Then, in one scenario, pairs of objects of the first type are compared for similarity by running them through the first predictive model as if one object of the pair is an object of the first type and the other object of the pair is an object of the second type. Alternatively, for each object in a set of objects of the first type, the first predictive model is used to create a respective vector of compatibility scores against a fixed set of objects of the second type; these various vectors are then used to derive measures of similarity between pairs of objects of the first type, from which a second predictive model is trained, and the second predictive model is then used to assess the similarity of pairs of objects of the first type.

11 Claims, 6 Drawing Sheets

PRODUCTION

APPLICATION-SPECIFIC METHOD AND APPARATUS FOR ASSESSING SIMILARITY BETWEEN TWO DATA OBJECTS

RELATED APPLICATIONS

This application is a continuation-in-part of U.S. application Ser. No. 09/589,180 filed May 26, 2000 entitled METHOD AND APPARATUS FOR MAKING PREDICTIONS ABOUT ENTITIES REPRESENTED IN DOCUMENTS, the disclosure of which is hereby incorporated by reference.

FIELD OF THE INVENTION

The present invention relates to data classification and, more particularly, to assessing similarity between two data objects of the same type.

BACKGROUND OF THE INVENTION

Ascertaining the similarity between two documents is useful for searching databases to find the document that best matches a query or the document most like a particular search document, where the meaning of "most like" will vary according to the application. Ascertaining similarity is also useful for removing duplicate documents from a database, for cataloging or indexing documents, and for calculating supply of similar documents or data objects. Many different approaches have been tried.

For example, the current state of the art in assessing document similarity is exemplified by an approach developed by Thomas Hofmann. Hofmann's method for learning the similarity of documents is explained in "Learning the Similarity of Documents: An Information-Geometric Approach to Document Retrieval and Categorization," in Advances in Neural Information Processing Systems 12, S. A. Solla, T. K. Leen, and K.-R Muller, eds, pp. 914–920, MIT Press, 2000. This method uses probabilistic latent semantic analysis (PLSA) to create vectors describing documents and then measures the similarity of those vectors. As explained in "Probabilistic Latent Semantic Indexing", in Proceedings of the $22^{nd}$ International Conference on Research and Development in Information Retrieval (SIGR '99), pp. 50–57, ACM, 1999, by Thomas Hofmann, PLSA models documents as memoryless information sources (i.e., bags of words in which the importance of a word is not related to the structure of the document or the occurrence of other words in the document). The model assumes that the documents are combinations of "latent classes" or factors, each of which has a different probability distribution over words and attempts to learn two things:

(1) the set of latent factors that explains a corpus of documents by maximum likelihood estimation (this part is PLSA). After the system's parameters are learned, to assess the similarity of two documents, the documents are decomposed into their factor representations, and the system then assesses the similarity of their factor representations (using dot product to measure similarity); and (2) the similarity of the actual words in the document (again using dot products), where the importance of each word is weighted by how well it is explained by the factors in the context of each document.

In a supervised setting, e.g. text classification, the similarity functions can be used to create very effective classifiers, as the author demonstrates empirically. Because this method is unsupervised and uses the bag-of-words assumption (that the importance of a word is not related to the structure of the document or the occurrence of other words in the document), the derived similarity function is not able to exploit or account for application-specific features and structure of documents that make them more or less similar. It is not able to account for different nuances of "similarity" that might occur in different applications. For example, documents such as resumes have application-specific reasons to weigh a job title in a resume very heavily. As another example, a college application has application-specific reasons to weigh heavily the names of classes taken. Hofmann's system is also more difficult to train than more conventional learning approaches, such as neural networks, because of the large numbers of parameters that must be learned.

U.S. Pat. No. 5,461,698, Schwanke; Robert W., et al, METHOD FOR MODELLING SIMILARITY FUNCTION USING NEURAL NETWORK, takes a different approach. This patent describes a method of learning a similarity function that accounts for an a-priori known clustering of objects. The assignment of objects to groups must be known before learning the similarity function. The particular application area of this patent is understanding the structure of a software system composed of modules, declarations, and so on. The neural network described takes as input the raw features of three objects A, B, and C, where A and B are from the same cluster and C is outside the cluster. Through training with many such triples, the network must learn a similarity function able to predict that A and B are more similar to each other than either are to C. They derive their model incrementally using a set of classifications of the objects then a partial set of similarity judgments like "A is more like B than C is".

This method uses discrete features (e.g. presence or absence of some name) rather than continuous variables, so the set operations make sense in its particular areas of application, assignment of an object to a category, but it is less useful if the intent is to describe similarity according to continuously varying features.

There have been two attempts to learn application-specific similarity functions in a supervised manner, given measurements of features of objects at the input and a teaching signal of similarity at the output. The first of these is described in "Feature Abstraction from Similarity Ratings: A Connectionist Approach," by Peter M. Todd and David E. Rumelhart, Todd and Rumelhart propose a neural network solution to a long-standing problem in psychology: what feature dimensions and similarity measures do humans use when judging the similarity of pairs of objects drawn from some set? Thus, they offer a solution to the problem of how to predict human similarity ratings for stimuli from a set of physical feature measurements.

Todd and Rumelhart's model combines the strengths of geometric models of similarity (e.g. multidimensional scaling) with feature set matching. Geometric models suffer from the problem that they ignore the actual features of the stimuli being compared and cannot predict the similarity of (generalize to) previously unseen stimulus pairs, whereas featural models previously lacked feature abstraction abilities: they could not infer the stimulus feature dimensions relevant to predicting human similarity judgments.

The Todd and Rumelhart model begins with input feature measurements from each stimulus. These inputs are followed by a layer of feature abstraction units, which form weighted combinations of the input features. The abstract feature extraction layer is followed by a layer of feature comparison units, which compute, e.g., the distance between the two stimuli along each abstract feature dimension. This is followed by a stimulus similarity output unit, which produces a simple function of the abstract feature comparisons best predicting human judgments of stimulus similarity. The system is trained by presenting it with pairs of stimuli at the input and a human-provided teaching signal at the output and adjusting the weights in the network by gradient descent until the network's actual output for training pairs is close to the human-provided teaching signal. The authors demonstrate the system's successful feature abstraction on several small data sets such as kinship relationships (e.g. how similar is the term "brother" to "nephew"?) and Morse code data (e.g. how similar is the Morse code for "E" to the Morse code for "8"?).

Other attempts at solving this problem are described in "Predicting Similarity Ratings to Faces using Physical Descriptions," Steyvers and Busey, in Computational, Geometric, and Process Perspectives on Facial Cognition: Contexts and Challenges, M. Wenger and J. Townsend (eds). Lawrence Erlbaum Associates (2000). Steyvers and Busey extend Todd and Rumelhart's metric similarity model to incorporate a nonmetric concept of similarity. Nonmetric approaches assume that similarity and distance judgment ratios are unimportant, but rather that the monotonic relationships between similarity judgments are important. That is, if a human observer says "sim(A,B)=0.5 and sim(C,D)= 0.6", all the system needs to know is that sim(A,B)>sim(C, D). Steyvers and Busey's system (similar to Todd and Rumelhart's but incorporating the nonmetric assumption) is trained on human judgments of similarity on all possible pairs of 100 faces of bald males. The model's inputs are, in this case, physical measurements of facial features (e.g. distance between the eyes).

Presently, document similarity and other kinds of data object similarity pose problems not faced in the work of Steyvers and Busey and Todd and Rumelhart; examples of such problems include:

First, the set of possible data objects to be compared is much larger (tens of thousands or millions of documents versus dozens of faces, kinship relationships, and Morse code elements). One implication of this is that, while smaller datasets can have humans decide which objects are similar to which other objects, with large numbers of data objects, having humans make the ratings is impossible.

Second, the number of input features for documents is potentially enormous (the term vector representation of a document typically contains tens of thousands of elements).

Third, both of the methods require that data objects be labeled prior to analysis by the system. Thus, they require early human intervention for labeling.

Combined, these factors conspire to make the task of exhaustive human similarity rating for pairs of stimuli impossible.

SUMMARY OF THE INVENTION

The disclosed invention is an application-specific method and apparatus for assessing similarity between two data objects of type X by the use of predictive modeling. One embodiment uses a single predictive model; and another embodiment is similar to the first but adds a second predictive model.

One embodiment of the present invention uses a predictive model that has been trained to assess compatibility between data objects of type X and data objects of type Y. Pairs of objects of type X are compared for similarity by running them through the first predictive model as though one were a data object of type X and the other a data object of type Y.

Another embodiment also utilizes a predictive model that has been trained to assess compatibility between data objects of type X and data objects of type Y, but as an oracle for training a second predictive model. For each of a set of data objects of type X, the first predictive model is used to create a vector of compatibility scores against a fixed set of data objects of type Y. A comparison of these score compatibility vectors is used to measure similarity between a pair of objects of type X, serving as the target to train a second predictive model. This second predictive model, possibly using different variables than the first model, is then used to assess similarity of other pairs of data objects of type X.

BRIEF DESCRIPTION OF DRAWINGS

The above mentioned and other objects and features of this invention and the manner of attaining them will become apparent, and the invention itself will be best understood, by reference to the following description of the embodiment of the invention in conjunction with the accompanying drawing, wherein.

DETAILED DESCRIPTION

The present invention relates to an application-specific method and apparatus for assessing similarity between two data objects by the use of a predictive model. For the sake of convenience and concreteness, the invention will be described with data objects being documents, but this is not necessary for the use of the invention, as the method is equally useful for non-document data objects. Such document and non-document data objects include but are not limited to examples, such as:

a) individuals in an employment context (where X-data= resumes and Y-data=job postings, to answer a question "How many candidates, or job openings, are there like this one?" and "Which ones are they?");

b) records of problem troubleshooting, wherein X-data comprises situation characteristics and Y-data comprises situation analysis. This could be diagnosis of problems by a help-desk troubleshooter, to answer a question "Who else has had this problem?" or "What else could this problem be?";

c) driving records (where X-data=driving records and Y-data=records of accidents, to answer a question for an insurance company, "Who else has, or how many have, this kind of driving record?" or "How many accidents are like this one?");

d) a school context (where X-data=student records and Y-data=school applications, to answer a question for a college "Which high school students are most like this one?" The question "How many high school students are like this one" is related to "Where should we set admission standards to get the right number of students?");

e) a medical context (where X-data=medical records or events and Y-data=prognoses, to answer a question "How many people have this medical problem, and who are they?");

f) a real-estate context (where X-data=descriptions of homes for sale and Y-data=descriptions of potential buyers, to answer the question "If a customer likes a particular house, which other houses should a real estate agent show him?"); and g) a criminal justice context (where X-data=criminal records and Y-data=descriptions of crimes, to answer a question "Who else is a likely suspect to have committed a particular crime?").

In the examples above, designation of data objects as being of type X or type Y can be reversed.

The inventive method will be described in terms of an employment exchange application, where data objects are resumes and job descriptions, but this is in no way intended to limit the applications for which the method is suitable.

Figure 1:
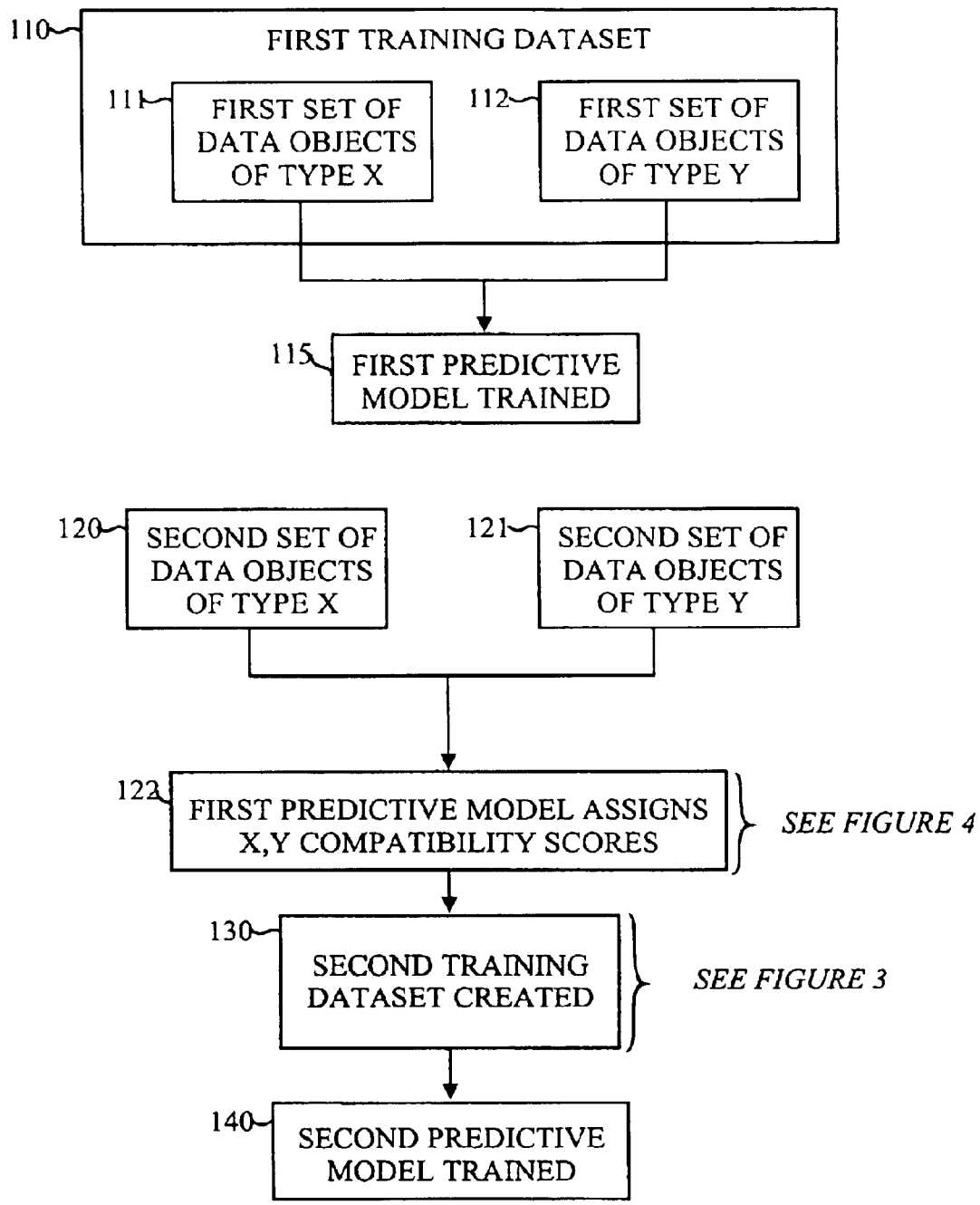
FIG. 1 illustrates a flow-chart of development stages according to an embodiment of the present invention.
Figure 2:
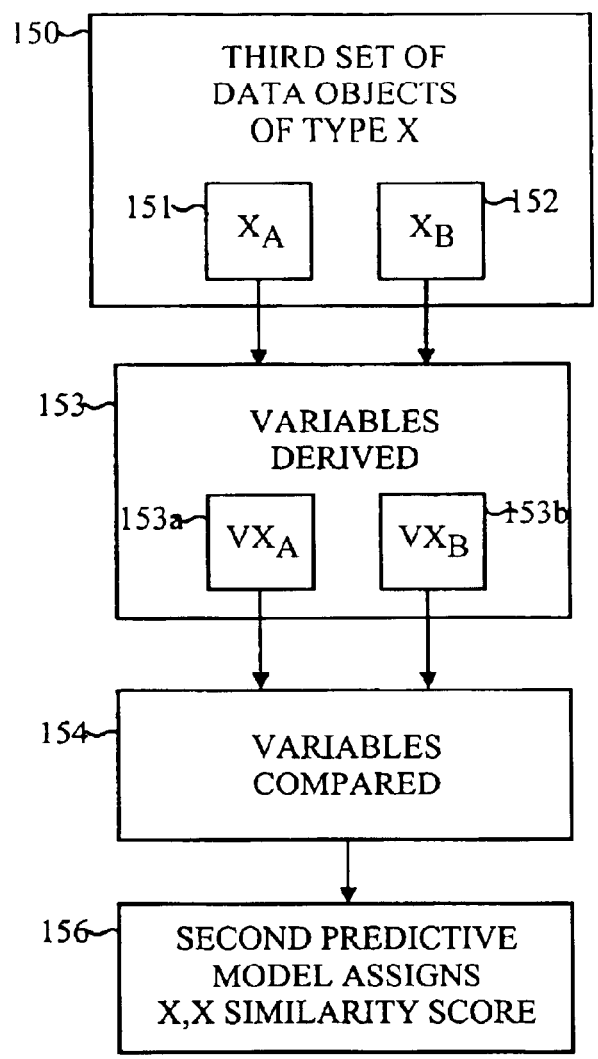
FIG. 2 illustrates a flowchart of the production stages according to an embodiment of the present invention.
Figure 3:
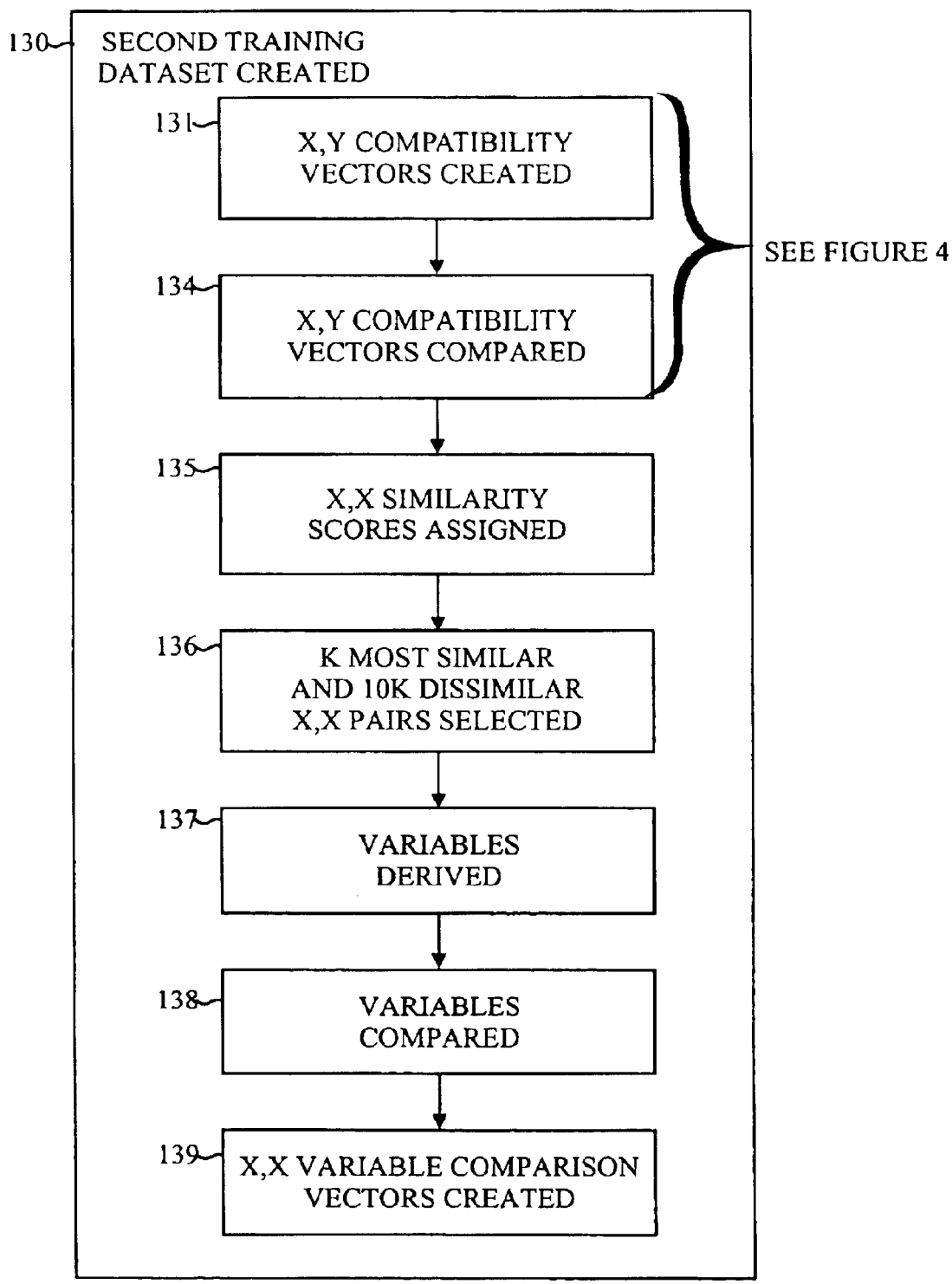
FIG. 3 illustrates a flow-chart for creating a second training dataset in accordance with one embodiment of the present invention.
Figure 4:
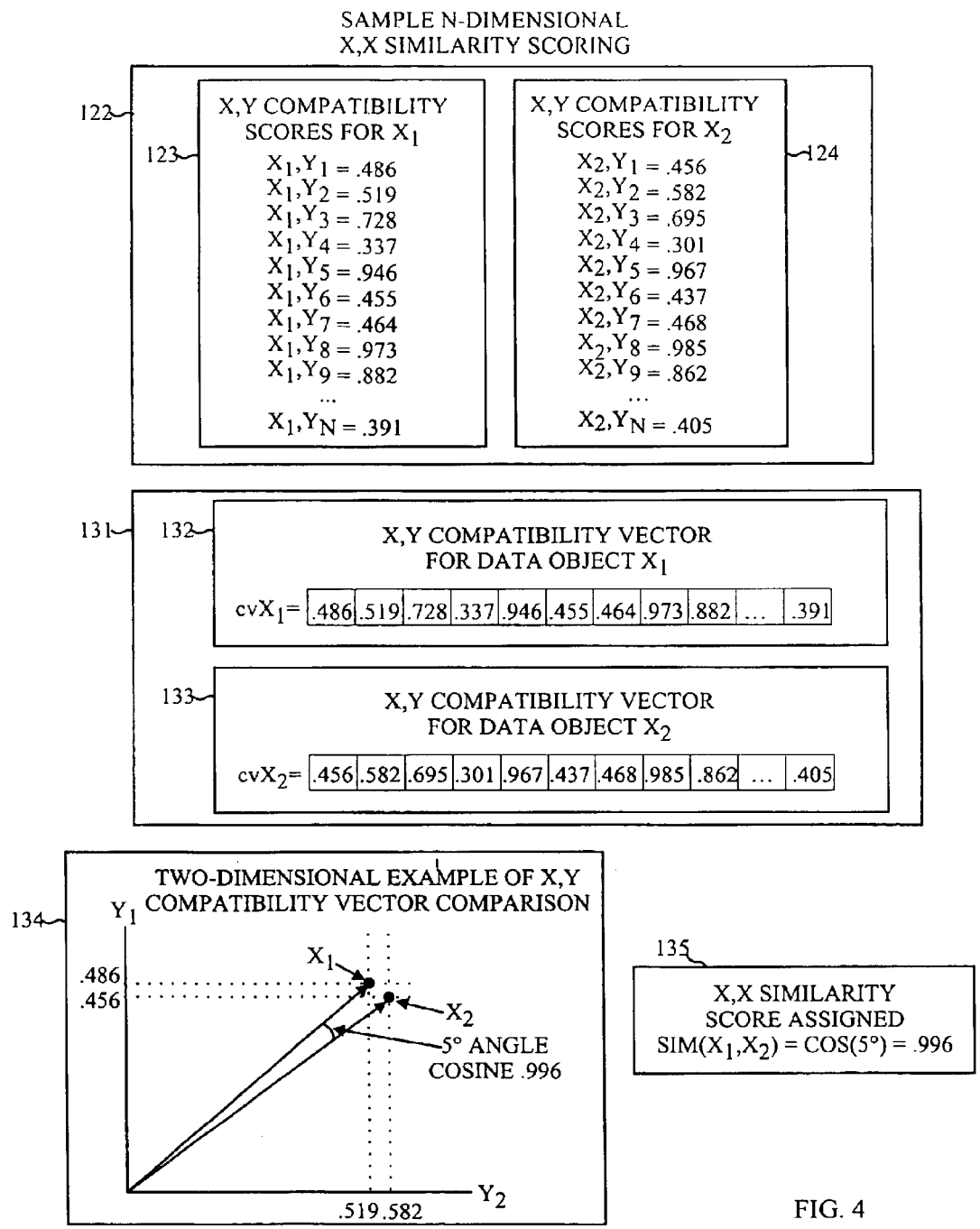
FIG. 4 illustrates an exemplary n-dimensional X,X similarity scoring in accordance with an embodiment of the present invention.

The method of the invention is divided into two general parts: development and production. Development, which is illustrated by FIG. 1, FIG. 3, and FIG. 4, involves training a first predictive model 115, results of which are used to train a second predictive model 130. Production, which is illustrated by FIG. 2 and FIG. 4, involves using the second predictive model a 156 to assess similarity between two data objects 151 and 152. Two specific embodiments will be discussed, one that uses a single predictive model and one that uses two predictive models. The two-model method will be discussed first and be given the most emphasis; it is the more complicated of the two methods.

Development

Similarity between two data objects is assessed by considering the compatibility of each of those two data objects with the same other data objects. That is, two data objects of type X are similar to each other to the extent that they are compatible with the same data objects of type Y. Job candidates are similar to the extent that they are suitable for the same jobs. Students are similar to the extent that they are suitable for the same schools.

A First Predictive Model

The first step in developing the system of the current invention is to create or acquire a first predictive model that can assess the compatibility of data objects of type X with data objects of type Y. Predictive models involve well-developed technology in use in many applications. In a preferred embodiment, the predictive models used are back-propagation neural networks. Other types of predictive models can be used, including regressions and symbolic leaning algorithms such as ID3, which is described in "Machine Learning for Information Retrieval: Neural Networks, Symbolic Learning, and Genetic Algorithms," Hsinchun Chen.

It is possible for a developer to buy or license a first predictive model ready-made for assessing compatibility between textual documents or other data objects and thus to use a first predictive model while avoiding the step of having to create one. One preferred and effective computer software system for assessing such compatibility is known by the trademark Lens™, owned by Burning Glass Technologies and described in pending U.S. patent application Ser. No. 09/589,160. This exemplary software includes natural language processing and semantic analysis to intelligently extract the "meaning" from the text of a document; the software also includes neural networks to compare a data object of type X and a data object of type Y. This comparison is usually expressed as a compatibility score or match score, and it indicates the probability that two data objects are compatible with each other.

If a user of the present inventive system desires not to use ready-made software such as Lens™ for the first step, a first predictive model is trained 115 with a first training dataset 110 comprising a first set of data objects of type X 111 and a matched first set of data objects of type Y 112. Methods for doing this are well known to one of ordinary skill in the art as described, for example, in J. Hertz, A. Krogh, and R. G. Palmer. Introduction to the Theory of Neural Computation. Addison-Wesley, 1994.

Data objects of type X and data objects of type Y can be entirely different kinds of data objects or the same kind of data object at different stages or in different conditions. A data object of type X can be a portion of a data object of type Y, or vice versa.

Data objects can be numeric, textual, or symbolic. If data objects used are textual, they are converted to a reduced numeric representation in the preferred embodiment. This conversion is ordinary in the use of predictive models, and, in this context, a resulting document vector or database record is equivalent in meaning to the text document from which the document vector or database record is derived.

A reduced representation can be obtained by any of various means well known to those skilled in the art, including: singular value decomposition (SVD), which is a component of Latent Semantic Indexing; principal component analysis (PCA); latent variable estimation; and factor analysis.

In the preferred embodiment, factor analysis is used. Such conversion is an ordinary part of predictive modeling. This reduced numeric representation, expressed as a document vector for each of the first set of data objects of type X 111 and the first set of data objects of type Y 112, is used in the first training dataset 110 used to train the first predictive model 115.

In general, this reduced representation will be a global reduced representation. That is, a document will be treated as a "bag of words." This will vary with the application and the stage in the process. If a document is of a type where the most important information is contained in only part of the document, and if it is possible to separate out that part, then only that part might be represented in a reduced representation, which will reduce the noise level in the numeric representation. For example, if the documents are job postings (e.g., electronic descriptions of job openings), such job postings often include one section describing the job and another section describing the company. In this case, better results in terms of matching with job candidates are obtained if only the job description section is included in the reduced representation.

After document vectors are derived, the original first sets of data objects 111, 112 need not be used again in the process. Further steps in the process are performed using the document vectors (or other data-object vectors if the data objects are not documents), although ordinary language descriptions of predictive modeling typically appear to suggest using the data objects themselves or documents represented by document vectors. It is possible but not necessary to again create reduced representations of the data objects during later steps in the process. In this context, performing an operation on a data object, or on a document, or on a vector are all equivalent expressions.

Rung a First Predictive Model

After a first predictive model is trained 115, a second set of data objects of type X 120 and a second set of data objects of type Y 121 are run through said first predictive model, which assigns a compatibility score 122 between 0 and 1 to each X,Y pair 123, 124. For each one of the second set of data objects of type X 120, an X,Y compatibility vector is created 131, comprising the compatibility scores of that data object of type X with each data object of type Y 132, 133.

In this manner, a target for X,X pairs is created for training a second predictive model 140. This target can be continuous or binary. Continuous methods would use a continuous scoring system, while binary methods use samples of "match" and "non-match" for training the second predictive model. There are many means of doing this scoring, including the use of a threshold score or taking a fixed number of matches. Using an X,Y model and a fixed set of data objects of type Y, for this second predictive model, similarity between two data objects of type X will be based on how close their X,Y compatibility vectors 131 are.

The number of data objects in the second sets is not critical and will vary according to the application. On the order of 10,000 data objects of type X and on the order of 100 data objects of type Y are preferable. However, as few as 20 data objects of type Y can produce useful data.

Choosing a Second Training Dataset

The second training dataset, as discussed above, is used to create a target for a second predictive model that will compare similarity between two data objects of type X. The training dataset is chosen by comparing each X,Y compatibility vector with each other X,Y compatibility vector 134. The comparison method can be any of numerous methods known to those skilled in the art. Such methods include the cosine of the angle between the X,Y compatibility vectors; the Euclidean distance between the X,Y compatibility vectors; and the dot product of the X,Y compatibility vectors. Each X,X pair is assigned a similarity score 135 based on said comparison of their X,Y compatibility vectors 134.

For each one of the second set of data objects of type X 120, it and the K other data objects of type X with the highest similarity scores with each one of the second set of data objects of type X 120 are, selected as matched pairs 136, and selected other data objects from the second set of data objects of type X 120 with lower similarity scores are selected as distracters 136. In one embodiment of the employment-exchange application being described, K=2 has been found to provide useful results. These matched X,X pairs and X,X distracters constitute a second training dataset 130 with which to train a second predictive model 140. This second predictive model can be the same kind as the first predictive model, or it can be an entirely different kind of model.

Variables are derived 137 from each of the second set of data objects of type X 120. The nature and details of the variables will vary with the application. In the employment exchange example, the following variables, derived from each resume, can be used:

1. Reduced representation of the words in the resume. This is a vector that is the result of taking the resume's term vector and reducing its dimensionality to a low-dimensional representation via, e.g., factor analysis or SVD. The dimensionality reduction method can be trained on all resume words or focus on a particular class of words, e.g. skill words.

2. Reduced representation of the words in the education section of a resume. As in (1) above, except the education section is reduced in isolation.

3. Reduced representation of each job description in the resume. Reduced representations of each job description are obtained by the same dimensionality reduction technique used for variables (1) and (2) above. Using the reduced representations of job descriptions has a complication that does not occur for the other variables, which is that two resumes being compared might not have the same number of jobs listed in the experience section, and the duration of jobs might vary. To account for this discrepancy, job description comparisons are rolled up according to their duration and recency as follows. Suppose Resume 1 and Resume 2 include the following job histories:

|  | Resume$_1$ |  |  | Resume$_2$ |  |
|---|---|---|---|---|---|
| Job dates | Job name | Job weight | Job dates | Job name | Job weight |
| 1999–today | $J_{11}$ | $W_{11}$ | 1994–today | $J_{21}$ | $W_{21}$ |
| 1990–1999 | $J_{12}$ | $W_{12}$ | 1992–1994 | $J_{22}$ | $W_{22}$ |
|  |  |  | 1990–1992 | $J_{23}$ | $W_{23}$ |

Figure 5:
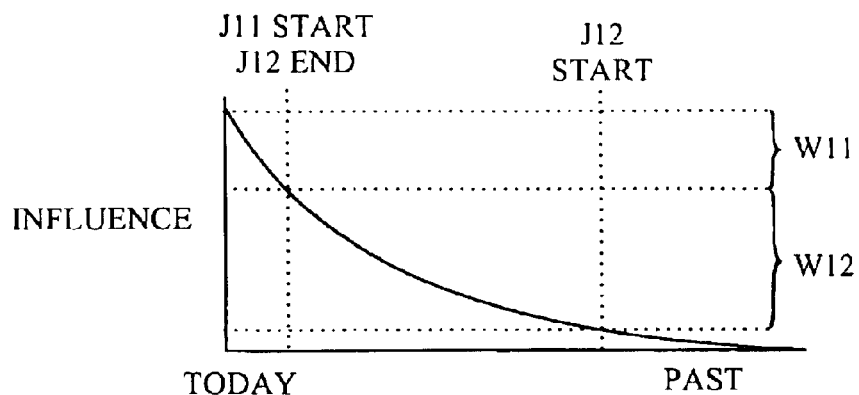
FIG. 5 illustrates a method for weighting job experience in an exemplary employment-related embodiment of the invention.
Figure 5:
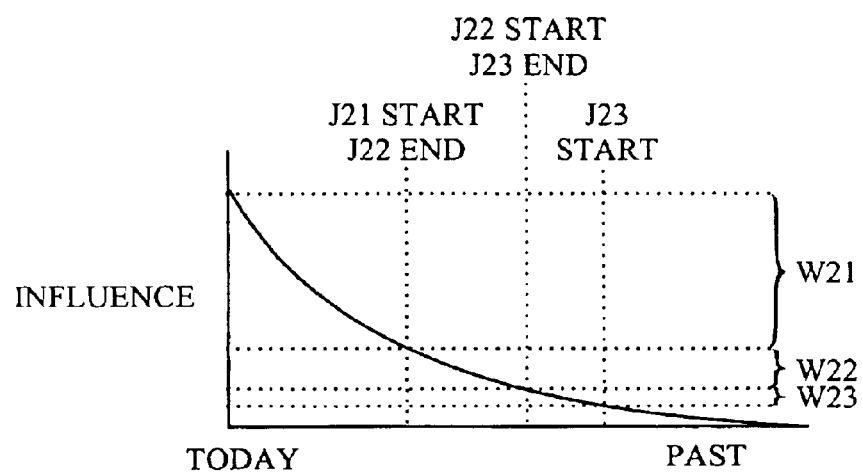

Job weights are derived as illustrated in FIG. 5, which shows the weight function of each job as the influence level of the end of a job minus the influence level of the start of the same job. From observing FIG. 5, it will be immediately apparent to those skilled in the art that, in this scheme, the assigned weight of a job is higher as the job is more recent and as it has been held for a longer time. The preferred embodiment uses a decaying exponential function to determine the shape of the curve in FIG. 5, but any monotonically decreasing function could be used, as well as other functionally equivalent functions.

4. Years of experience. This is the number of years between the start date of the oldest job listed in the experience section and the end date of the most recent job. If the end date of the most recent job is "present" or not listed, it is taken to be the current year.

5. Standardized variables. Standardized variables are also used, such as job titles, skill names, names of colleges, names of college majors, degree, industry SIC code (Standard Industrial Classification code). Other variables are used in the employment example if information on them is available, such as average salary or last salary, but this kind of information is frequently not available.

Comparing Variables

Each document is at this point represented by a set of variables. For each X,X pair, the variables are compared 138. For comparison of numeric vectors, one simple method of comparison is to use a weighted squared Euclidean distance measure, such as:

$$(R_1 // R_2) = \sum_k w_k (R_{1k} \cdot R_{2k})^2$$

where the weights $w_k$ are learned from the second training dataset by back propagation. Another common method of comparison uses the cosine of the angle between vectors:

$$\cos(\vec{r_1}, \vec{r_2}) = \frac{\vec{r_1} \cdot \vec{r_2}}{\|\vec{r_1}\| \|\vec{r_2}\|}$$

In comparing a pair of vectors like those described in (1) and (2) above, the cosine between the two low-dimensional numeric representations is determined. This cosine becomes an input feature value for the predictive model.

In comparing variables of type (3) between resumes, after weights have been assigned, job histories are compared by first comparing pairs of the vectors described above then weighting the pairwise comparisons by multiplying the weight functions of the job descriptions, as shown below and illustrated in FIG. 5. The exemplary comparisons can include: Cosine of J11 vector compared with J21 vector with weight (W11 times W21), Cosine of J11 vector compared with J22 vector with weight (W11 times W22), Cosine of J11 vector compared with J23 vector with weight (W11 times W23), Cosine of J12 vector compared with J21 vector with weight (W12 times W21), Cosine of J12 vector compared with J22 vector with weight (W12 times W22), and Cosine of J12 vector compared with J23 vector with weight (W12 times W23)

The similarity of job histories $J_1$ and $J_2$ is thus $$Sim(J_1, J_2) = \sum_{l=1}^{|J_1|} \sum_{m=1}^{|J_2|} w_{1l} \cdot w_{2m} \cdot Sim(X_{1l}, X_{2m})$$

where x1L is the numeric representation of the description of job L in resume 1, and x2M is the numeric representation of job M in resume 2.

The sum of the weighted comparisons is another input feature for the predictive model. In comparing years of experience variables, any measure of similarity or dissimilarity of the two values will work. In the preferred embodiment, the difference between the log-transformed years of experience in each resume is used.

The preferred method for comparing standardized variables between two resumes includes converting the standardized variables to numeric representations for comparison. The simplest method is to assign a compatibility of 1 if two variable standardized values (e.g., job titles or course names) are the same, and 0 if they are not the same. This is too simple to be effective, because "Software Consultant" is closer to "Software Engineer" than to "Administrative Assistant," so standardized-compatibility numbers should vary between 0 and 1 according to relative closeness.

If software such as Lens™ is used as a first predictive model, this software includes a table describing how often people transition from one job title to another. This job-transition table can be used to create a job title similarity table by rating two job titles A and B as being similar if people who have job title A had the same job titles previous to holding job A that people who have job B had before holding job B or if people holding job A thereafter move to the same jobs that people holding job B do.

Another effective way to assess similarity between various standardized values without relying on all the capabilities of a software application such as Lens™ is to establish the similarity beforehand by a human expert who rates pairs of job titles or other standardized values by degrees of similarity. The results of each comparison between standardized variables, whether based on application of human expertise or reference to a job-transition table, becomes an element in the later comparisons.

The results of comparisons of selected data objects from the second set of data objects of type X are stored. A second training dataset is thus created 130 comprising X,X comparisons for similar vectors and for dissimilar vectors. This second training dataset is used to train a second predictive model 140. Training is done by ordinary means, depending on the kind of predictive model employed. The preferred embodiment uses neural networks, and conventional methods of training them as are known in the art.

Alternative Development

Figure 6:
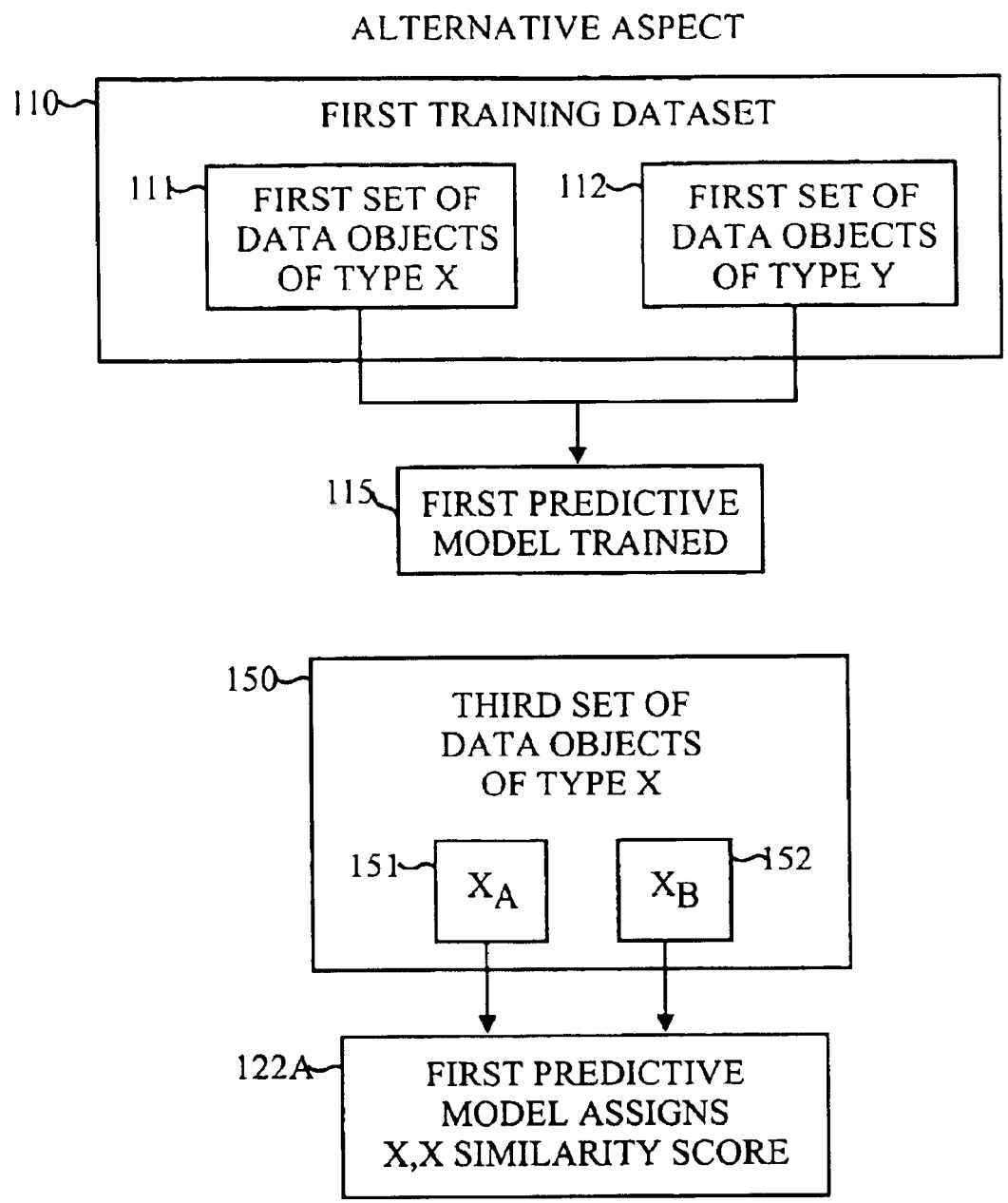
FIG. 6 illustrates an alternative embodiment of the present invention.

The above discussion of development of the invention relates to an embodiment in which two predictive models are used. In an alternative embodiment in which only one predictive model is used, which is illustrated in FIG. 6, the development is simpler. In this embodiment, when the first predictive model is trained 115, the model is constrained in a way that objects in the first set of data objects of type Y 112 are treated in a manner that would be appropriate for treating objects of type X 111. For example, if objects of type Y are considered as a bag of words, then objects of type X are also considered as a bag of words. Or, in the employment example, if postings are considered as a bag of words, a skills section can be extracted from resumes and considered as a bag of skill words, which can be used as though it were a data object of type Y. If the operations on data objects of type Y are constrained as discussed above, the operation is considerably simpler than the two-model method.

Production

As the development stages varied between the two exemplary embodiments (one using a single predictive model and the other using two predictive models), so production varies with these same embodiments as well.

In the single predictive model embodiment, in which the model is constrained to treat data objects of type X and data objects of type Y the same way, after the first predictive model is trained 115 in this way, two objects of type X 151 and 152 can be run through the first predictive model and scored for similarity 122A as though they were an object of type X and an object of type Y being scored for compatibility. The resulting score is an X,X similarity score.

Two-model Method

In the embodiment using a second predictive model, where production includes the deployment of the second predictive model on a third set of data objects of type X 150, comprising at least two data objects of type X. The second predictive model is used to compare pairs of data objects of type X and to assess their similarity with each other as follows:

Two data objects of type X ($X_1$ 151 and $X_2$ 152) are selected from the third set of data objects of type X 150. Variables $VX_A$ 153A and $VX_B$ 153B are derived 153 from the two data objects of type X ($X_1$ 151 and $X_2$ 152). These are the same types of variables that were derived 137 from members of the second training dataset during development of the second predictive model. Variables for the two data objects of type X are compared 154 in the same manner that variables were compared in the second training dataset 138.

The X,X comparison is run through the second predictive model, resulting in a similarity score 156 between 0 and 1 for said two data objects of type X.

Features and Uses

The embodiments of the present invention described in detail above are exemplary in nature, and many modifications and variations in detail are envisioned and expected, which may be specific to the application. For example, in the use of the invention in an employment context, a user who is an employer looking for employees might enter a resume that is the actual resume of a successful employee, and the employer wants to find similar resumes in a database of resumes. A job candidate could likewise enter a job description of a desired job and search a database for similar jobs. The method can be used to develop supply or demand statistics by finding the number of candidates like this one or the number of jobs like this one in a database.

In either case, in the embodiment of the employment example, a user can select a section of a resume or job description, for example the skills section or the most recent job experience, and ask the system to return resumes or job postings most like the selected part. A user can be allowed to control how various match-metrics of sub-components are combined. For example, the described resume embodiment compares numeric and standardized variables derived from the overall document, the education section in isolation, and the experience section in isolation. If the user desires a strong match on education but is less concerned about past employment details, the system could weight the education section comparisons more heavily than the global or experience comparison in computing a final assessment of the similarity of two resumes.

If the method is used as part of a system for matching job postings and resumes, as described in U.S. application Ser. No. 09/589,180 filed May 26, 2000 entitled METHOD AND APPARATUS FOR MAKING PREDICTIONS ABOUT ENTITIES REPRESENTED IN DOCUMENTS, the currently disclosed method can be used to develop X,X similarity scores to organize data for efficient match-scoring of X,Y pairs with the first predictive model, since similar documents can be expected to have similar match scores with the same documents. Documents would be clustered according to their similarity to each other.

This method will increase operating efficiency of the first predictive model when a data object of type Y is entered by sampling clusters of data objects of type X and running the full model only on those data objects of type X that are in a cluster in which the sample scored high.

Whether or not the method is used as part of a system for matching job postings and resumes, X,X similarity scores can be used to cluster or organize a database of data objects of type X.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A computer-based method for assessing similarity between two data objects, comprising the steps of:
   a. training a first predictive model with a first set of data objects of type X and matched data objects of type Y;
   b. using said first predictive model to assess compatibility between each of a plurality of X,Y pairs, wherein for each X,Y pair, each X is a member of a second set of data objects of type X and each Y is a member of a second set of data objects of type Y;
   c. assigning an X,Y compatibility score to each X,Y pair;
   d. comparing the X,Y compatibility scores of each member of the second set of data objects of type X with each other member of the second set of data objects of type X;
   e. pairing each member of the second set of data objects of type X with selected other members of the second set of data objects of type X having similar X,Y compatibility scores to identify a first plurality of X,X pairs, said first plurality of X,X pairs being matched pairs for training a second predictive model;
   f. selecting other ones of the second set of data objects of type X that do not have as similar compatibility scores as the matched pairs to identify a second plurality of X,X pairs, said second plurality of X,X pairs being distracters for training said second predictive model;
   g. deriving a respective set of variables from each member of the second set of data objects of type X;
   h. comparing the respective set of variables derived from each X,X matched pair and from each X,X distracter pair to determine a set of X,X comparisons;
   i. training a second predictive model with said set of X,X comparisons;
   j. receiving two data objects of type X that are not in either the first training dataset or second training dataset;
   k. deriving respective variables from each of said two data objects of type X;
   l. comparing the respective variables derived from each of said two data objects of type X to determine a production X,X comparison; and
   m. running said production X,X comparison through said second predictive model to calculate a similarity score for said two data objects of type X.

2. The method of claim 1, wherein either of said first and second predictive models comprise a respective neural network.

3. The method of claim 1, wherein either of said first and second predictive models comprise a respective regression model.

4. The method of claim 1, wherein the two data objects of type X include documents.

5. The method of claim 1, wherein the two data objects of type X include one of resumes and job descriptions.

6. The method of claim 5, wherein the respective derived variables and the respective sets of derived variables include one or more of following:
   i. reduced representation of the words in a resume;
   ii. reduced representation of the words in the education section of a resume;
   iii. reduced representation of each job description in a resume;
   iv. years of experience;
   v. standardized variables;
   vi. such as job titles;
   vii. industry SIC codes; and
   viii. degree names.

7. The method of claim 1, further comprising the steps of:
   n. repeating steps j) through m) for a plurality of production data objects of type X not in the first and second training datasets; and
   o. clustering the plurality of production data objects according to the calculated similarity scores.

8. The method of claim 1, further comprising the steps of:
   n. repeating steps j) through m) for a plurality of production data objects of type X in a database; and
   o. organizing the database of production data objects of type X based on the calculated similarity scores.

9. The method of claim 1, further comprising the steps of:

n repeating steps j) through m) for a plurality of production data objects of type X; and o. deriving from the calculated similarity scores one of a measure of supply of data objects of type X and a measure of demand for a particular one of the plurality of the production data objects of type X.

10. The method of claim 1, wherein the step of comparing the respective variables further includes the steps of:

i) constructing a vector for each of the two data objects from the derived respective variables; and ii) calculating the cosine of the angle between the vectors.

11. The method of claim 1, wherein the step of comparing the respective variables further includes the steps of:

i) constructing a vector for each of the two data objects from the derived respective variables; and ii) calculating the dot product of the vectors.

* * * * *